United States Patent Office 3,652,600
Patented Mar. 28, 1972

3,652,600
**2-FLUORO-2,2-DINITROETHYL
GLYCIDYL ETHER**
Vytautas Grakauskas, Arcadia, Calif., assignor to the
United States of America as represented by the Secretary of the Navy
No Drawing. Filed Nov. 26, 1969, Ser. No. 880,457
Int. Cl. C07d 1/18
U.S. Cl. 260—348 R                   1 Claim

ABSTRACT OF THE DISCLOSURE 2-fluoro-2,2-dinitroethyl glycidyl ether is synthesized by reacting 2-fluoro-2,2-dinitroethanol with an epihalohydrin in the presence of sodium hydroxide and water.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the invention

This invention relates in general to fluoro-nitro compound and more particularly to glycidyl ethers with halide and nitro substituents on the nonglycidyl moiety.

(2) Description of the prior art

It is well known that fluoro-nitro compounds are finding continuously expanding utilization in the fields of propellants and explosives, as binders, plasticizers or as the neat material. In addition compounds of this type are also exhibiting activity in biological and insecticidal applications. Despite the extreme interest in such compounds, the present glycidyl ether with dinitro and halogen substituents on the nonglycidyl moiety is novel in the art.

SUMMARY OF THE INVENTION

The composition of the present invention relates to 2-fluoro-2,2-dinitroethyl glycidyl ether prepared by reacting 2-fluoro-2,2-dinitroethanol with epichlorohydrin or its bromine analog in the presence of aqueous sodium hydroxide.

This glycidyl ether is an energetic compound utilized in the propellant and explosive fields as well as in the synthesis of energetic polyether binders.

OBJECTS OF THE INVENTION

An object of the present invention is to provide a novel fluoro-nitro substituted glycidyl ether.

Another object of the present invention is to provide the specific compound 2-fluoro-2,2-dinitroethyl glycidyl ether.

A further object of the present invention is to provide a method of preparing such novel glycidyl compounds in suitable quantities and of high purity.

Other objects, advantages, and novel features of the invention will become apparent from the following detailed description.

DESCRIPTION OF THE PREFERRED EMBODIMENT

This invention involves a novel fluoro-nitro compound 2-fluoro-2,2-dinitroethyl glycidyl ether which was synthesized by reacting 2-fluoro-2,2-dinitroethanol with an epihalohydrin in aqueous sodium hydroxide solution in accordance with the following equation:

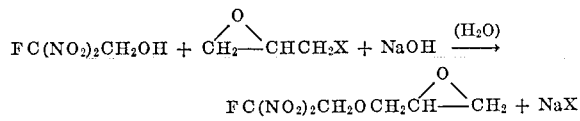

X=Cl; Br

The following examples will serve to illustrate the invention but are not intended to be limiting thereof.

EXAMPLE I

To a solution of 4.6 g. (0.03 mole) of 2-fluoro-2,2-dinitroethanol in 70 ml. of water at 25° C. was added with stirring 4.1 g. (0.03 mole) of epibromohydrin and a solution of 1.4 g. (0.035 mole) of sodium hydroxide in 25 ml. of water. After 15 minutes the reaction mixture was warmed to 33–34° C. and kept at this temperature for 30 minutes. The reaction mixture was then allowed to cool to 25° C. and after 2 hours the phases were separated. The water-insoluble material was distilled to give about 0.8 g. of a colorless liquid, boiling point 75–77° C. and established to be 2-fluoro-2,2-dinitroethyl glycidyl ether.

EXAMPLE II

A mixture of 6.2 g. (0.04 mole) of 2-fluoro-2,2-dinitroethanol and 3.7 g. (0.04 mole) of epichlorhydrin was added dropwise with stirring at 5° to a solution of 2.5 g. of sodium hydroxide in 75 ml. of water. The resulting solution was allowed to stand for 0–5° C. for a period of 48 hours. A heavy oil separated. The organic phase, 4.0 g., was separated, dissolved in 30 ml. of methylene chloride, dried, filtered, and the filtrate was worked up to give 2.6 g. of a colorless liquid, boiling point 70–71° C. resulting in at 31% yield.

While the compound of this invention is useful primarily as a propellant or explosive, it may also be used in the synthesis of energetic polyether binders.

The composition may also ultimately find use as a plasticizer and in biological and insecticidal applications.

I claim:
1. The compound 2-fluoro-2,2-dinitroethyl glycidyl ether having the formula:

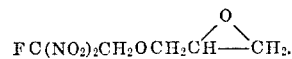

References Cited

UNITED STATES PATENTS 3,335,155  8/1967  Linden et al. _____ 260—348 R
2,898,349  8/1959  Zuppinger et al. ____ 260—348.6

NORMA S. MILESTONE, Primary Examiner

U.S. Cl. X.R.

260—999, 30.4 R; 44—63; 149—88